(12) United States Patent
Yamanaka et al.

(10) Patent No.: US 10,139,003 B2
(45) Date of Patent: *Nov. 27, 2018

(54) LIP SEAL FOR WATER PUMP

(71) Applicant: EAGLE INDUSTRY CO., LTD., Tokyo (JP)

(72) Inventors: Takuya Yamanaka, Tokyo (JP); Suguru Yoshida, Tokyo (JP); Masafumi Kato, Tokyo (JP); Hideyuki Murakami, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 288 days.

This patent is subject to a terminal disclaimer.

(21) Appl. No.: 14/439,988

(22) PCT Filed: Feb. 17, 2014

(86) PCT No.: PCT/JP2014/053638
§ 371 (c)(1),
(2) Date: Apr. 30, 2015

(87) PCT Pub. No.: WO2014/126240
PCT Pub. Date: Aug. 21, 2014

(65) Prior Publication Data
US 2015/0354706 A1 Dec. 10, 2015

(30) Foreign Application Priority Data
Feb. 18, 2013 (JP) .................. 2013-028618

(51) Int. Cl.
| | | |
|---|---|---|
| *F16J 15/32* | (2016.01) | |
| *F16J 15/3284* | (2016.01) | |
| *F16J 15/3204* | (2016.01) | |
| *F04D 29/10* | (2006.01) | |
| *C08K 3/36* | (2006.01) | |
| *C08K 3/04* | (2006.01) | |
| *C09K 3/10* | (2006.01) | |
| *F16J 15/10* | (2006.01) | |
| *C08K 3/34* | (2006.01) | |
| *C08K 5/14* | (2006.01) | |
| *C08K 5/54* | (2006.01) | |

(52) U.S. Cl.
CPC ............ *F16J 15/3284* (2013.01); *C08K 3/04* (2013.01); *C08K 3/34* (2013.01); *C08K 3/36* (2013.01); *C08K 5/14* (2013.01); *C08K 5/54* (2013.01); *C09K 3/1006* (2013.01); *C09K 3/1009* (2013.01); *F04D 29/10* (2013.01); *F04D 29/106* (2013.01); *F16J 15/102* (2013.01); *F16J 15/3204* (2013.01); *C09K 2200/0239* (2013.01); *C09K 2200/0243* (2013.01); *C09K 2200/0282* (2013.01); *C09K 2200/0612* (2013.01); *C09K 2200/0645* (2013.01)

(58) Field of Classification Search
CPC .... F16J 15/3282; F16J 15/3204; F16J 15/102; F16J 15/3284; C08K 3/04; C08K 3/36; C08K 3/34; C08K 5/14; C08K 5/54; F04D 29/10; F04D 29/106; C09K 2200/0239; C09K 2200/0243; C09K 2200/0282; C09K 2200/0612; C09K 2200/0645; C09K 3/1006; C09K 3/1009
USPC .................. 277/570; 524/431, 448, 544, 571
See application file for complete search history.

(56) References Cited

U.S. PATENT DOCUMENTS

| | | | | |
|---|---|---|---|---|
| 2001/0000788 A1* | 5/2001 | Ono | ...................... | C08K 3/0033 524/544 |
| 2002/0061953 A1* | 5/2002 | Takita | .................. | C08K 5/0025 524/435 |
| 2003/0013818 A1* | 1/2003 | Hakuta | .................... | C08L 23/16 525/331.9 |
| 2003/0044269 A1 | 3/2003 | Iketani | | |
| 2003/0178786 A1* | 9/2003 | Siegrist | ................ | F16J 15/3236 277/549 |

(Continued)

FOREIGN PATENT DOCUMENTS

| | | |
|---|---|---|
| CN | 101203565 A | 6/2008 |
| CN | 101784349 A | 7/2010 |

(Continued)

OTHER PUBLICATIONS

International Search Report from corresponding PCT application No. PCT/JP2014/053638 dated May 20, 2014.

(Continued)

*Primary Examiner* — Nathan Cumar
(74) *Attorney, Agent, or Firm* — Brinks Gilson & Lione

(57) ABSTRACT

Disclosed is a lip seal for water pump made of a rubber-like elastic material, fixed to a housing as a fixed side and in sliding contact with a shaft rotating relative to the housing; the lip seal having sliding surface with a surface roughness Ra (according to JIS B0601 corresponding to ISO 4287) of 1 to 30 µm, being obtained by vulcanization-molding of a rubber composition comprising 100 parts by weight of the rubber-like elastic material, 1 to 150 parts by weight of a reinforcing filler, 5 to 90 parts by weight of a non-reinforcing filler having an average particle diameter of 1 µm or more, 0.1 to 5 parts by weight of a coupling agent, 1 to 15 parts by weight of a co-crosslinking agent, and 0.5 to 10 parts by weight of an organic peroxide. The lip seal effects to prevent softening and volume swelling of the rubber-like elastic material and furthermore the generation of deposits in the rotating shaft, which are problematic for rotation torque and LLC resistance.

10 Claims, No Drawings

(56) References Cited

U.S. PATENT DOCUMENTS

| | | | |
|---|---|---|---|
| 2004/0066004 A1* | 4/2004 | Yano | F04D 29/049 |
| | | | 277/353 |
| 2005/0245666 A1 | 11/2005 | Yamanaka | |
| 2007/0299200 A1 | 12/2007 | Kobayashi et al. | |
| 2009/0171000 A1 | 7/2009 | Amemiya et al. | |
| 2010/0190018 A1 | 7/2010 | Higashira et al. | |
| 2012/0309881 A1 | 12/2012 | Tsukimori et al. | |
| 2014/0203520 A1 | 7/2014 | Yamanaka et al. | |

FOREIGN PATENT DOCUMENTS

| | | |
|---|---|---|
| CN | 103688062 A | 3/2014 |
| EP | 2 174 723 A1 | 4/2010 |
| JP | 2000-009235 | 1/2000 |
| JP | 2002-080639 | 3/2002 |
| JP | 2003-74491 A | 3/2003 |
| JP | 2004-217851 A | 8/2004 |
| JP | 2006-037044 | 2/2006 |
| JP | 2006-131700 A | 5/2006 |
| JP | 2008-180342 | 8/2008 |
| JP | 2011-122105 A | 6/2011 |

OTHER PUBLICATIONS

International Preliminary Patentability Report and Written Opinion from corresponding PCT application No. PCT/JP2014/053638 dated Aug. 18, 2015.

* cited by examiner dd # LIP SEAL FOR WATER PUMP

RELATED APPLICATION

The present application is a 35 U.S.C. § 371 national stage filing of International Patent Application No. PCT/JP2014/053638, filed Feb. 17, 2014, to which priority is claimed under 35 U.S.C. § 120 and through which priority is claimed under 35 U.S.C. § 119 to Japanese Priority Patent Application No. 2013-028618, filed Feb. 18, 2013, the entire specification of which is hereby expressly incorporated by reference.

TECHNICAL FIELD

The present invention relates to a lip seal for water pump. More particularly, the present invention relates to a lip seal for water pump made of a rubber-like elastic material, fixed to a housing as a fixed side and in sliding contact with a shaft rotating relative to the housing.

BACKGROUND ART

In the case of lip seals used to seal aqueous fluids, such as LLC (long life coolant), the low lubricity of sliding surfaces causes significant abrasion due to sliding and leads to high heat generation. LLC containing organic acid, particularly 2-ethylhexanoic acid, causes significant softening and swelling of the lip seal, thus reducing sealing properties. Moreover, LLC containing phosphate or silicate leads to accumulation of phosphoric acid compounds or silicate compounds on the shaft and formation of a gap between the shaft and the lip seal, thus reducing sealing properties.

In order to improve lubricity in such a case, Patent Document 1 discloses a water pump sealing device using a lubricating grease for a lip lubricating.

More specifically, the water pump sealing device, which is fitted between a housing and a shaft so that a sealing fluid, such as LLC, does not leak from the inside of the device to the outside, can improve the lubricity of a seal lip sliding part to prevent the seal lip from being prematurely worn by slidable movement. In one structure, the sealing device comprises a plurality of seal lips and a grease-impregnating member impregnated with a lip-lubricating grease, wherein the grease-impregnating member is arranged in a space part between a plurality of the seal lips. In another structure, the sealing device comprises a sleeve secured to a shaft, first and second seal lips in sliding contact with the sleeve, a backup ring, and a grease-impregnating member, wherein the grease-impregnating member is arranged in a space that lies between the both seal lips and that is a radical direction gap part where the sleeve and the backup ring are radially opposed to each other.

Meanwhile, Patent Document 2 proposes a hydrogenated nitrile rubber composition comprising 100 parts by weight of hydrogenated nitrile rubber, and a total amount of about 120 parts by weight or more of carbon black and other filler, such as graphite, carbon fiber, silica, talc, clay, PTFE powder, activated calcium carbonate, or calcium silicate. The hydrogenated nitrile rubber composition provides a crosslinked product having a thermal conductivity at 20° C. of 0.4 W/m·k or more and a 50% modulus of 14 MPa or more. Patent Document 2 indicates that the crosslinked product can significantly reduce the amount of heat generated during sliding, and thus can be suitably used as a sliding or high-pressure sealing material. However, when the crosslinked product is used as a lip seal to seal an aqueous-based fluid, such as LLC, the above-mentioned various properties inevitably decrease.

Moreover, Patent Document 3 proposes an NBR composition comprising 100 parts by weight of NBR, 1 to 150 parts by weight of white carbon (silica), and 0.5 to 50 parts by weight of an inorganic compound having an average particle diameter of 2 μm or less and a Mohs hardness of 6 or more, such as aluminum oxide, silicon carbide, tungsten carbide, zirconium oxide, iron oxide, titanium oxide, quartz powder, titanium nitride, titanium carbide, or zirconium carbide. Patent Document 3 indicates that a vulcanization-molded product of the NBR composition can achieve long life and energy saving when sealing materials are used in a sliding part, without impairing abrasion resistance. However, when the vulcanization-molded product is used as a lip seal to seal an aqueous-based fluid, such as LLC, the above-mentioned various properties inevitably decrease.

PRIOR ART DOCUMENT

Patent Document

Patent Document 1: JP-A-2008-180342
Patent Document 2: JP-A-2002-080639
Patent Document 3: JP-A-2006-037044

OUTLINE OF THE INVENTION

Problem to be Solved by the Invention

An object of the present invention is to provide a lip seal for water pump made of a rubber-like elastic material, fixed to a housing as a fixed side and in sliding contact with a shaft rotating relative to the housing, the lip seal providing a materially solution, rather than a structural solution, to prevent softening and volume swelling of the rubber-like elastic material and furthermore the generation of deposits in the rotating shaft, which are problematic for rotation torque and LLC resistance.

Means for Solving the Problem

The above object of the present invention can be achieved by the lip seal for water pump made of a rubber-like elastic material, fixed to a housing as a fixed side and in sliding contact with a shaft rotating relative to the housing;

the lip seal having sliding surface with a surface roughness Ra (according to JIS B0601 corresponding to ISO 4287) of 1 to 30 μm, being obtained by vulcanization-molding of a rubber composition comprising 100 parts by weight of the rubber-like elastic material, 1 to 150 parts by weight of a reinforcing filler, 5 to 90 parts by weight of a non-reinforcing filler having an average particle diameter of 1 μm or more, 0.1 to 5 parts by weight of a coupling agent, 1 to 15 parts by weight of a co-crosslinking agent, and 0.5 to 10 parts by weight of an organic peroxide.

Effect of the Invention

According to the for lip seal water pump of the present invention, vulcanization molding of a rubber composition comprising a rubber-like elastic body, a reinforcing filler, a non-reinforcing filler having an average particle diameter of 1 μm or more, a coupling agent, a co-crosslinking agent, and an organic peroxide, and formation of a sliding surface having a specific surface roughness Ra (according to JIS B0601 corresponding to ISO 4287) lead to effective prevention of softening and swelling of the rubber material, and the generation of deposits in the rotating shaft, caused by an aqueous fluid, such as LLC.

In particular, the surface roughness is controlled by the presence of a filler on the contact surface of the shaft sliding surface; therefore, unlike the case in which the surface roughness of vulcanized rubber is controlled by mold, blast treatment, or the like, even when LLC containing phosphoric acid, or the like, which is likely to deposit on the shaft, is used, the effect of the filler to cut deposits is continued, and an excellent effect that no deposition occurs not only in the early stage but also after sealing abrasion is exhibited. Furthermore, a surface roughness Ra of about 1 to 30 μm is imparted to the sliding surface of the lip seal, and a liquid membrane is formed thereon to improve the lubrication state, thereby reducing torque. In addition, due to the reduced torque, heat generation by sliding can be reduced and abrasion can be prevented. Further, the use by adding of a filler having an average particle diameter of 1 μm or more can prevent softening and volume swelling caused by osmosis of aqueous-based fluid such as LLC, while suppressing an increase in hardness of the rubber-like elastic material.

EMBODIMENTS FOR CARRYING OUT THE INVENTION

The rubber-like elastic material for forming the lip seal for water pump is at least one of any rubber-like elastic materials, such as hydrogenated nitrile rubber, EPDM, and fluororubber; among which hydrogenated nitrile rubber is preferably used. Here, hydrogenated nitrile rubber that does not have a terminal functional group is preferably used.

Examples of the reinforcing filler include carbon black, silica, and the like. Moreover, the average particle diameter thereof is 5 nm to 150 μm, preferably 5 nm to 50 μm. The proportion of reinforcing filler is 1 to 150 parts by weight, preferably 30 to 70 parts by weight, based on 100 parts by weight of the rubber-like elastic material. When the proportion of reinforcing filler is less than this range, the required rubber physical properties are not obtained; whereas when the proportion is greater than this range, the sealing properties of the rubber decrease.

The filler as other than a reinforcing filler, as non-reinforcing filler, may be any of various non-reinforcing fillers. Preferred examples thereof include silicates, such as aluminum silicate ($Al_2O_3 \cdot SiO_2$), magnesium silicate ($4SiO_2 \cdot 3MgO \cdot H_2O$), and calcium silicate ($CaSiO_3$); carbon fiber, iron oxide, titanium oxide, diatomaceous earth, or the like, that have an average particle diameter (a fiber diameter in the case of carbon fiber), as measured by laser analysis, of 1 μm or more, preferably 1 to 40 μm. The use of a non-reinforcing filler having such an average particle diameter can prevent softening and volume swelling caused by osmosis of LLC, while suppressing an increase in hardness. Moreover, due to the presence of such a filler in the sliding surface, deposits on the shaft generated when LLC containing phosphoric acid, or the like, is used can be cut to prevent deposition on a continuous basis.

Furthermore, a roughness of about 1 to 30 μm is imparted to the sliding surface, and a liquid membrane is formed by the action thereof to improve the lubrication state, thereby reducing torque and heat generation by sliding, and suppressing abrasion, etc. Imparting of a surface roughness Ra of about 1 to 30 μm to the sliding surface is performed by adjusting the type and amount of filler. When Ra is lower than this range, the lubrication state of the sliding surface is worsened, and the cutting effect of deposits becomes low; as a result, deposits are formed on the sliding surface, thereby worsening the sealing properties. In contrast, when Ra is greater than this range, the gap of the sliding surface becomes large, thus worsening sealing properties.

In contrast, when a non-reinforcing filler having an average particle diameter of less than 1 μm is used, the cutting effect of deposits becomes low, and sealing properties cannot be ensured when LLC containing phosphoric acid, or the like, is used. Further, the liquid membrane forming ability is lowered, thereby leading to worsening of the lubrication state.

The proportion of non-reinforcing filler is 5 to 90 parts by weight, preferably 5 to 70 parts by weight, based on 100 parts by weight of the rubber-like elastic material. When the proportion of filler is less than this range, the desired effect of the present invention cannot be obtained; whereas when the proportion is greater than this range, the physical property evaluation (elongation at break) is low.

The coupling agent may be a silane-, titanium-, zirconium- or aluminum-based coupling agent; among which a silane-based coupling agent is preferably used. The presence of the coupling agent strengthens adhesion between the rubber and the filler, and suppresses a phenomenon in which LLC is collected in the rubber/filler interface because of osmosis of LLC. As a result, softening and swelling are suppressed. Moreover, since the volume effect of the filler relatively reduces the volume of the swollen rubber polymer, swelling is also suppressed in this respect.

Examples of silane-based coupling agents include vinyl-, glycidoxy-, methacryloxy-, and amino-based silane coupling agents, such as vinyltrichlorosilane, vinyltrimethoxysilane, vinylethoxysilane, 2-(3,4-epoxycyclohexyl)ethyltrimethoxysilane, 3-glycidoxypropyltrimethoxysilane, 3-glycidoxypropylmethyldiethoxysilane, p-styryltrimethoxysilane, 3-methacryloxypropylmethyldimethoxysilane, 3-methacryloxypropyltrimethoxysilane, N-2-(aminoethyl)-3-aminopropylmethyldimethoxysilane, 3-aminopropyltrimethoxysilane, and N-phenyl-3-aminopropyltrimethoxysilane.

Examples of titanium-based coupling agents include titanium diisopropoxybis(triethanolaminate), titanium lactate ammonium salt, titanium lactate, titanium dioctyloxybis (octyleneglycolate), and the like. Examples of zirconium-based coupling agents include zirconium tetra-n-butoxide, zirconium tetraacetylacetonate, zirconium tributoxymonoacetylacetonate, zirconium monobutoxy acetylacetonatebis (ethylacetoacetate), zirconium butoxybis(ethylacetoacetate), zirconium tetraacetylacetonate, zirconium tributoxymonostearate, and the like. Moreover, examples of aluminum-based coupling agents include acetoalkoxy aluminum diisopropylate, and the like.

The proportion of coupling agent is 0.1 to 5 parts by weight, preferably 0.5 to 3 parts by weight, based on 100 parts by weight of the rubber-like elastic material. When the proportion of coupling agent is less than this range, the dipping test will show inferior results; whereas when the proportion is greater than this range, physical properties, such as elongation at break, decrease.

Examples of the organic peroxide include t-butyl peroxide, dicumyl peroxide, t-butylcumyl peroxide, 1,1-di(t-butylperoxy)-3,3,5-trimethylcyclohexane, 2,5-dimethyl-2,5-di (t-butylperoxy)hexane, 2,5-dimethyl-2,5-di(t-butylperoxy) hexyne-3, 1,3-di(t-butylperoxyisopropyl)benzene, 2,5-dimethyl-2,5-di(benzolyperoxy)hexane, t-butylperoxy benzoate, t-butylperoxy isopropyl dicarbonate, n-butyl-4,4'-di(t-butylperoxy)valerate, and the like. The proportion of organic peroxide is 0.5 to 10 parts by weight, preferably 1 to 8 parts by weight, based on 100 parts by weight of the rubber-like elastic material.

When performing organic peroxide crosslinking, a polyfunctional unsaturated compound, such as triallyl isocyanurate, triallyl cyanurate, triallyl trimellitate, trimethylolpropane trimethacrylate, or N,N'-m-phenylenebismaleimide, is used as a co-crosslinking agent. The proportion of co-crosslinking agent is 1 to 15 parts by weight, preferably 2 to 10 parts by weight, based on 100 parts by weight of the rubber-like elastic material. The use of a co-crosslinking agent leads to tight crosslinking, and suppresses softening and swelling caused by osmosis of LLC. When the proportion of co-crosslinking agent is less than this range, the dipping test will show inferior results, that is, softening and swelling cannot be sufficiently suppressed. In contrast, when the proportion is greater than this range, the evaluation of physical properties, such as elongation at break, will be inferior.

The composition comprising the above components may suitably contain processing aids, such as stearic acid, palmitic acid, and paraffin wax; acid acceptors, such as zinc oxide, magnesium oxide, and hydrotalcite; antioxidants; plasticizers; and other compounding agents that are generally used in the rubber industry, if necessary.

The preparation of the rubber composition is carried out by kneading the components by using open rolls or a kneading machine such as intermix, kneader, or Banbury mixer. Crosslinking of the kneaded product is generally carried out by heating at about 150 to 200° C. for about 3 to 60 minutes using an injection molding machine, compression molding machine, vulcanizing press, or the like, optionally followed by secondary crosslinking by heating at about 100 to 200° C. for about 1 to 24 hours.

Due to the presence of the filler having an average particle diameter of 1 m or more, the sliding surface of the vulcanization-molded lip seal has concave-convex portions with a surface roughness Ra (arithmetic average roughness defined by JIS B 0601) of 1 to 30 µm. Therefore, when the lip seal is used as a lip seal made of a rubber-like elastic material, fixed to a housing as a fixed side and in sliding contact with a shaft rotating relative to the housing, the aforementioned various effects can be obtained.

EXAMPLES

The following describes the present invention with reference to Examples.

Example 1

| | |
|---|---|
| Hydrogenated nitrile rubber (Zetpol 2011, produced by Zeon Corporation) [HNBR] | 100 parts by weight |
| Carbon black (G-SO, produced by Tokai Rubber Industries, Ltd.) [CB] | 45 parts by weight |
| Aluminum silicate (No. 5 Clay, produced by Takehara Kagaku Kogyo Co., Ltd.; average particle diameter: 5.3 µm) | 15 parts by weight |
| Silane-based coupling agent (KBM602, produced by Shin-Etsu Chemical Co., Ltd.) | 0.5 parts by weight |
| Co-crosslinking agent A (Acryester ED, produced by Mitsubishi Rayon Co., Ltd.; ethyleneglycol dimethacrylate) | 6 parts by weight |
| Antioxidant (Antage 6C, produced by Kawaguchi Chemical Industry Co., Ltd.; N-1,3-dimethylbutyl-N'-phenyl-p-phenylenediamine) | 3 parts by weight |
| Organic peroxide A (Perbutyl P, produced by NOF Corporation; α,α'-di(t-butylperoxy)diisopropylbenzene) | 3 parts by weight |

The above components were kneaded by 10-inch rolls, and the knead product was subjected to primary vulcanization at 180° C. for 5 minutes and oven vulcanization (secondary vulcanization) at 150° C. for 1 hour, thereby vulcanization-molding a rubber sheet (thickness: 2 mm) and a lip seal.

The obtained crosslinked products were measured by the following items. Regarding test pieces, the rubber sheet was used in the physical property evaluation and the dipping test, and the lip seal was used in the torque test and the deposition test.

Physical property evaluation: Elongation at break was measured according to JIS K6251 corresponding to ISO 37 and evaluated as follows:
150% or more: ○; and less than 150%: ×

Torque test: Using water as a sealing fluid, torque was measured by rotating a 15-mm-diameter shaft at a rotational speed of 0 to 5,000 rpm and evaluated as follows: torque lower than that of Comparative Example 1: ○; and torque equal to or greater than that of Comparative Example 1: ×

Dipping test: According to JIS K6258 corresponding to ISO 1817, the test piece was dipped in an aqueous solution of organic acid-adding LLC (concentration: 30 volume %) under conditions of 120° C., atmospheric pressure (natural temperature rising), and for 2,000 hours, and the volume change after dipping was evaluated as follows: less than +10%: ○; and +10% or more: ×

Deposition test: Using an aqueous solution of phosphoric acid-adding LLC (concentration: 30 volume %) as a sealing fluid, a rotation test was performed under conditions of 6,000 rpm, 120° C., 0.15 MPa, and for 50 hours, and the results were evaluated as follows: no deposition in the sliding part of the shaft after the test: ○; and deposition occurred: ×

Surface roughness: The arithmetic average roughness Ra (3 times) of the sliding surface of the lip seal was measured according to JIS B0601 corresponding to ISO 4287

Sealing properties: The leakage rate (ml/hr) of an LLC aqueous solution during the Deposition test was measured and evaluated as follows: leakage rate of less than 0.2 ml/hr: ○; and leakage rate of 0.2 ml/hr or more: ×

Example 2

In Example 1, the amount of aluminum silicate was changed to 5 parts by weight.

Example 3

In Example 1, the amount of aluminum silicate was changed to 70 parts by weight.

Example 4

In Example 1, the amount of aluminum silicate was changed to 30 parts by weight, and 15 parts by weight of carbon fiber (Donacarbo S-241, produced by Osaka Gas Chemicals Co., Ltd.; fiber diameter: 13 μm, fiber length: 130 μm) was further used.

Example 5

In Example 1, the same amount (100 parts by weight) of EPDM (EPT3045, produced by Mitsui Chemicals, Inc.) was used in place of hydrogenated nitrile rubber.

Example 6

| | |
|---|---|
| Fluororubber (Daiel G901, produced by Daikin Industries, Ltd.) | 100 parts by weight |
| Carbon black (G-SO) | 45 parts by weight |
| Aluminum silicate (No. 5 Clay) | 15 parts by weight |
| Silane-based coupling agent (KBM-602) | 0.5 parts by weight |
| Co-crosslinking agent B (Taic WH-60, produced by Nippon Kasei Chemical Co., Ltd.; triallyl isocyanurate) | 3 parts by weight |

Example 7

In Example 1, the same amount (15 parts by weight) of calcium silicate (NYAD 1250, produced by NYCO Minerals, Inc.; average particle diameter: 4.5 μm) was used in place of aluminum silicate.

Example 8

In Example 4, the same amount (30 parts by weight) of calcium silicate (NYAD 1250) was used in place of aluminum silicate.

Example 9

In Example 1, 40 parts by weight of carbon fiber (Donacarbo S-341, produced by Osaka Gas Chemicals Co., Ltd.; fiber diameter: 18 μm, fiber length: 180 μm) was used in place of aluminum silicate.

Table 1 below shows the evaluation results obtained in the Examples, together with the amount of each component (unit: part by weight).

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| [Composition component] | | | | | | | | | |
| HNBR | 100 | 100 | 100 | 100 | — | — | 100 | 100 | 100 |
| EPDM | — | — | — | — | 100 | — | — | — | — |
| Fluororubber | — | — | — | — | — | 100 | — | — | — |
| CB | 45 | 45 | 45 | 45 | 45 | 45 | 45 | 45 | 45 |
| Al silicate (particle diameter: 5.3 μm) | 15 | 5 | 70 | 30 | 15 | 15 | — | — | — |
| Ca silicate (particle diameter: 4.5 μm) | — | — | — | — | — | — | 15 | 30 | — |
| Carbon fiber (fiber diameter: 13 μm) | — | — | — | 15 | — | — | — | 15 | — |
| Carbon fiber (fiber diameter: 18 μm) | — | — | — | — | — | — | — | — | 40 |
| Si coupling agent | 0.5 | 0.5 | 0.5 | 0.5 | 0.5 | 0.5 | 0.5 | 0.5 | 0.5 |
| Co-crosslinking agent A | 6 | 6 | 6 | 6 | 6 | — | 6 | 6 | 6 |
| Co-crosslinking agent B | — | — | — | — | — | 6 | — | — | — |
| Antioxidant | 3 | 3 | 3 | 3 | 3 | 3 | 3 | 3 | 3 |
| Organic peroxide A | 3 | 3 | 3 | 3 | 3 | — | 3 | 3 | 3 |
| Organic peroxide B | — | — | — | — | — | 3 | — | — | — |
| [Evaluation results] | | | | | | | | | |
| Physical property evaluation | ○ | ○ | ○ | ○ | ○ | ○ | ○ | ○ | ○ |
| Torque test | ○ | ○ | ○ | ○ | ○ | ○ | ○ | ○ | ○ |
| Dipping test | ○ | ○ | ○ | ○ | ○ | ○ | ○ | ○ | ○ |
| Deposition test | ○ | ○ | ○ | ○ | ○ | ○ | ○ | ○ | ○ |
| Surface roughness Ra (μm) | 4.0 | 1.5 | 4.8 | 8.2 | 4.1 | 4.3 | 4.0 | 5.6 | 20.0 |
| Sealing properties | ○ | ○ | ○ | ○ | ○ | ○ | ○ | ○ | ○ |

-continued

| | |
|---|---|
| Organic peroxide B (Perhexa 25B40, produced by NOF Corporation; 2,5-dimethyl-2,5-di(t-butylperoxy)hexane; purity: 40%) | 2 parts by weight |

Using the above components, kneading, vulcanization-molding, and measurement were performed in the same manner as in Example 1.

Comparative Example 1

In Example 1, the same amount (15 parts by weight) of clay (Hydrite, produced by Takehara Kagaku Kogyo Co., Ltd.; average particle diameter: 0.68 μm) was used in place of aluminum silicate.

Comparative Example 2

In Example 1, the amount of aluminum silicate was changed to 100 parts by weight.

Comparative Example 3

In Example 1, the amount of co-crosslinking agent A was changed to 20 parts by weight.

Comparative Example 4

In Example 1, no silane-based coupling agent was used.

Comparative Example 5

In Example 1, no co-crosslinking agent A was used.

Comparative Example 6

In Example 1, none of aluminum silicate, silane-based coupling agent, and co-crosslinking agent A was used.

Comparative Example 7

In Comparative Example 1, 30 parts by weight of mica powder (MC-120W, produced by Hayashi-Kasei Co., Ltd.; particle diameter: 53.3 μm) was used in place of clay.

Table 2 below shows the evaluation results obtained in the Comparative Examples, together with the amount of each component (unit: part by weight).

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- |
| [Composition component] | | | | | | | |
| HNBR | 100 | 100 | 100 | 100 | 100 | 100 | 100 |
| CB | 45 | 45 | 45 | 45 | 45 | 45 | 45 |
| Al silicate (particle diameter: 5.3 μm) | — | 100 | 15 | 15 | 15 | — | — |
| Clay (particle diameter: 0.68 μm) | 15 | — | — | — | — | — | — |
| Mica powder (particle diameter: 53.3 μm) | — | — | — | — | — | — | 30 |
| Si coupling agent | 0.5 | 0.5 | 0.5 | — | 0.5 | — | 0.5 |
| Co-crosslinking agent A | 6 | 6 | 20 | 6 | — | — | 6 |
| Antioxidant | 3 | 3 | 3 | 3 | 3 | 3 | 3 |
| Organic peroxide A | 3 | 3 | 3 | 3 | 3 | 3 | 3 |
| [Evaluation results] | | | | | | | |
| Physical property evaluation | ○ | X | X | ○ | ○ | ○ | X |
| Torque test | X | ○ | ○ | ○ | ○ | X | ○ |
| Dipping test | ○ | ○ | ○ | X | X | X | ○ |
| Deposition test | X | ○ | ○ | ○ | ○ | X | ○ |
| Surface roughness Ra (μm) | 0.5 | 5.1 | 3.9 | 3.8 | 4.2 | 0.3 | 41.2 |
| Sealing properties | X | ○ | ○ | ○ | ○ | X | X |

The invention claimed is:

1. A lip seal for water pump made of a rubber-like elastic material, fixed to a housing as a fixed side and in sliding contact with a shaft rotating relative to the housing; the lip seal having sliding surface with a surface roughness Ra (according to JIS B0601 corresponding to ISO 4287) of 1 to 30 μm, being obtained by vulcanization-molding of a rubber composition comprising 100 parts by weight of hydrogenated nitrile rubber or EPDM, 1 to 150 parts by weight of a reinforcing filler, 5 to 90 parts by weight of a non-reinforcing filler having an average particle diameter of 1 μm or more, 0.1 to 5 parts by weight of a coupling agent, 1 to 15 parts by weight of a co-crosslinking agent, and 0.5 to 10 parts by weight of an organic peroxide.

2. The lip seal for water pump according to claim 1, wherein the hydrogenated nitrile rubber is a hydrogenated nitrile rubber that does not have a terminal functional group.

3. The lip seal for water pump according to claim 1, wherein the non-reinforcing filler is at least one member selected from a group consisting of aluminum silicate, magnesium silicate, calcium silicate, carbon fiber, iron oxide, titanium oxide, and diatomaceous earth.

4. The lip seal for water pump according to claim 1, wherein the non-reinforcing filler has an average particle diameter of 1 to 40 μm.

5. The lip seal for water pump according to claim 1, wherein the non-reinforcing filler is used in an amount of 5 to 70 parts by weight.

6. The lip seal for water pump according to claim 1, wherein the reinforcing filler is carbon black or silica.

7. The lip seal for water pump according to claim 1, wherein the reinforcing filler is used in an amount of 30 to 70 parts by weight.

8. The lip seal for water pump according to claim 3, wherein the non-reinforcing filler has an average particle diameter of 1 to 40 μm.

9. The lip seal for water pump according to claim 3, wherein the non-reinforcing filler is used in an amount of 5 to 70 parts by weight.

10. The lip seal for water pump according to claim 6, wherein the reinforcing filler is used in an amount of 30 to 70 parts by weight.

* * * * *